(12) United States Patent
Nakajima et al.

(10) Patent No.: US 7,613,782 B2
(45) Date of Patent: Nov. 3, 2009

(54) COMMUNICATIONS CONTROL PROGRAM, COMMUNICATIONS CONTROL SERVER AND COMMUNICATIONS CONTROL METHOD

(75) Inventors: Satoshi Nakajima, Tokyo (JP); Tadashi Tsushima, Tokyo (JP); Ken Narita, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 409 days.

(21) Appl. No.: 11/462,181

(22) Filed: Aug. 3, 2006

(65) Prior Publication Data
US 2007/0033257 A1 Feb. 8, 2007

(30) Foreign Application Priority Data
Aug. 5, 2005 (JP) ............................ P2005-228942

(51) Int. Cl.
G06F 15/16 (2006.01)
(52) U.S. Cl. ..................... 709/206; 709/223; 709/224
(58) Field of Classification Search ................. 709/206, 709/204, 207, 223, 224, 205
See application file for complete search history.

(56) References Cited

U.S. PATENT DOCUMENTS

| | | | |
|---|---|---|---|
| 5,797,098 A | 8/1998 | Schroeder et al. | |
| 6,032,053 A | 2/2000 | Schroeder et al. | |
| 6,205,478 B1 * | 3/2001 | Sugano et al. | 709/223 |
| 6,405,060 B1 | 6/2002 | Schroeder et al. | |
| 7,058,690 B2 * | 6/2006 | Maehiro | 709/206 |
| 2002/0049806 A1 | 4/2002 | Gatz et al. | |
| 2002/0062350 A1 * | 5/2002 | Maehiro | 709/206 |
| 2002/0165024 A1 * | 11/2002 | Puskala | 463/40 |
| 2002/0168978 A1 | 11/2002 | Molnar et al. | |
| 2004/0215735 A1 * | 10/2004 | Nakahara et al. | 709/207 |
| 2005/0202875 A1 * | 9/2005 | Murphy et al. | 463/42 |
| 2005/0209002 A1 * | 9/2005 | Blythe et al. | 463/42 |
| 2007/0208865 A1 * | 9/2007 | Morris et al. | 709/228 |
| 2008/0119281 A1 * | 5/2008 | Hirose et al. | 463/42 |

FOREIGN PATENT DOCUMENTS

| | | |
|---|---|---|
| DE | 10114649 | 10/2002 |
| JP | 2003-319455 | 11/2003 |
| WO | 01/05118 | 1/2001 |

OTHER PUBLICATIONS

English language Abstract of JP 2003-319455.
English Language Abstract of DE 10114649.

* cited by examiner

*Primary Examiner*—Lashonda T Jacobs
(74) *Attorney, Agent, or Firm*—Greenblum & Bernstein, P.L.C.

(57) ABSTRACT

A communications control program in which communication over an open network is allowed only between users who have previously communicated with one another over a local network. A terminal automatically registers, with a destination list, destinations with which the terminal has communicated over a local network such as ad hoc communications. Destinations of communications over an open network are limited to destinations included in the destination list, and thereby communications with strangers with whom a user of the terminal has not communicated in the local area are restricted.

19 Claims, 7 Drawing Sheets

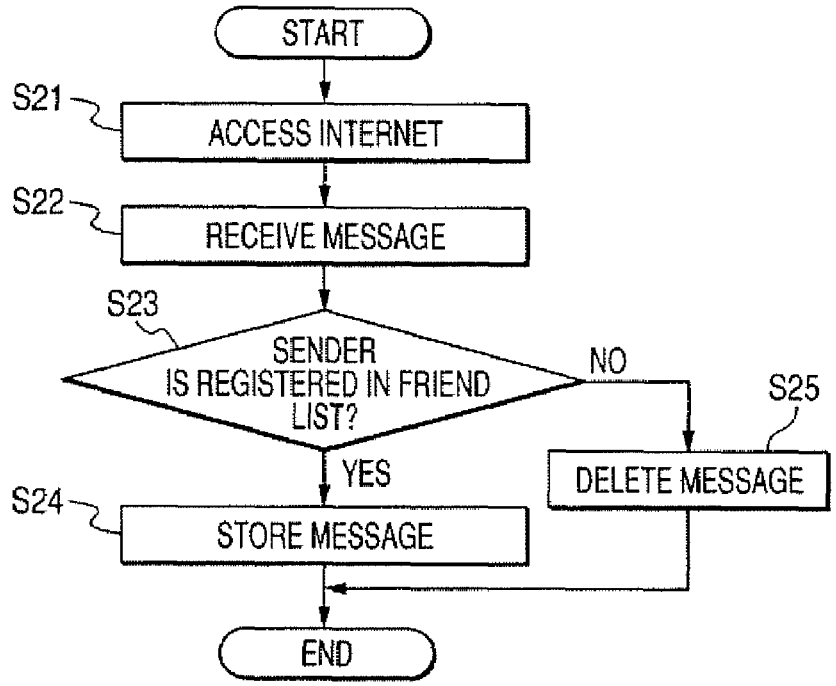
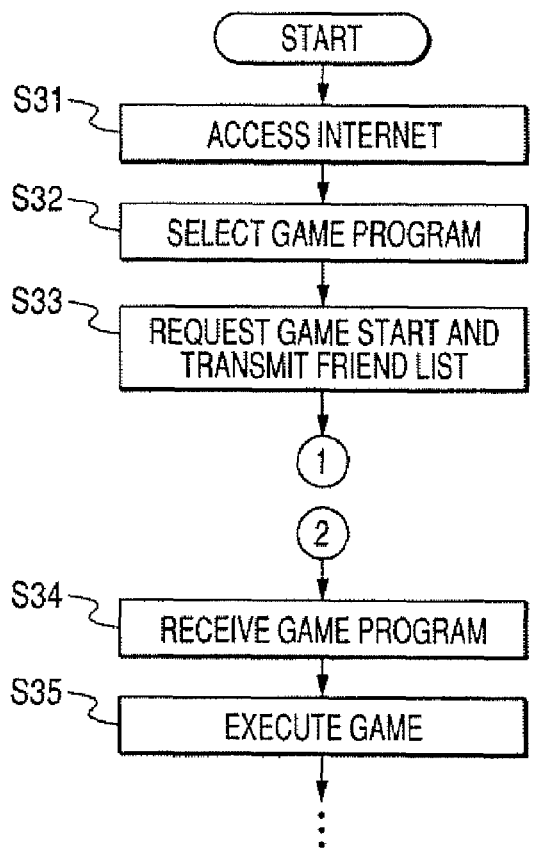

COMMUNICATIONS CONTROL PROGRAM, COMMUNICATIONS CONTROL SERVER AND COMMUNICATIONS CONTROL METHOD

CROSS REFERENCE TO RELATED APPLICATION

The present disclosure relates to subject matter contained in Japanese Patent Application No. 2005-228942, filed on Aug. 5, 2005, the disclosure of which is expressly incorporated herein by reference in its entirety.

BACKGROUND OF THE INVENTION

1. Field of the Invention

The present invention relates to a communications control program, a communications control server, a communication control method and a recording medium containing the communications control program, in which destinations of communications such as, for example, message exchanges, etc., that use an open network, such as, for example, the Internet, are limited to destinations that have previously performed communications using a local network such as, for example, a wireless network.

2. Description of the Related Art

The use of portable video game devices has rapidly grown in recent years, and they generally have communication functionalities that allow users to enjoy competition games. Most communications between the game devices are performed in a local area by connecting the devices, for example, via a cable or wireless ad hoc communications medium, in which a user communicates with another user face to face. However, as disclosed in <<http://www.playstation.jp/info/qa.php-?cid=453>>, portable game devices have been introduced, having the Internet access functionality, which allow a user to enjoy a competition game online with a number of other users from the convenience of one's home.

Unexamined Japanese Patent Publication No. 2003-319455 discloses a communication system between terminals having wireless communication capabilities in which a management server limits the number of terminals that can connect to a wireless network for the purpose of communications safety in the wireless network.

The increase in popularity of portable game devices having Internet access functionality, as described above, may result in a situation where a user plays a game with other users, for example, with whom the user really has not been acquainted, or has no familiarity; that is, in addition to the other users whom the user can see when using ad hoc communications. For example, children may use the portable game devices and, whereas they used to have contact with friends in their neighborhoods, they may now be more likely to communicate with strangers, where their guardians may not be able to keep an eye on their activities. There also exist fears that the users, for example, children, may easily obtain undesirable information over the Internet.

To avoid such a situation, it is preferable to configure a user terminal in advance to limit other persons or devices with which the user terminal can communicate unexamined Japanese Patent Publication No. 2003-319455 describes a system for limiting terminals that can perform communications in a wireless network. However, in this system, a management server limits specific terminals that can connect thereto by using a closed network such as a wireless LAN (local area network). However, a portable game device may be connected to the Internet, which is an open network. Therefore, it would be impossible to limit the connectable terminals by providing a management server.

In addition, a distribution server for an online game system may manage other users or devices that are to be communication partners in competition games or multiplayer games, for example. However, in such instances, a procedure for registration of group members with a management server is complicated. Further, it is difficult for the management server to confirm whether the registered groups are real acquaintances. In order to allow children to play games over the Internet without fear, the communications party to be communicated with via the Internet should preferably be limited to friends and the like, with whom the children are really acquainted as they communicates in ad hoc communications, etc.

SUMMARY OF THE INVENTION

It is an object of the invention to address the problem stated above. It is an object of the present invention to provide a program, a recording medium containing the program, a server and a method for controlling communications, in which communications such as message exchanges over an open network such as, for example, the Internet are allowed only between users who have previously communicated with one another over a local network such as, for example, a wireless network.

An aspect of the present invention is characterized in that a computer terminal such as, for example, a portable game machine automatically registers, in a destination list, destinations with which the computer terminal has communicated over a local network such as for example, ad hoc communications. An aspect of the invention is further characterized in that destinations of communications over an open network are limited to destinations included in a destination list, and thereby communications with strangers with whom a user of a terminal has not communicated in the local area are restricted. Aspects of the present invention may be understood according to five illustrative and exemplary aspects of a communications control program described below depending on the contents of communications performed over an open network.

According to a first aspect of the invention there is provided a computer readable medium containing a communications control program that causes a terminal to communicate over a local network and an open network. The terminal stores a destination list of destinations with which the terminal has previously communicated over the local network. The computer readable medium includes a request receiving code segment that causes the terminal to receive a transmission request for transmitting a message over the open network, the message having a destination. The computer readable medium further includes a determining code segment that causes the terminal to determine whether the destination of the message is included in the destination list. The computer readable medium further includes a message transmitting code segment that causes the terminal to transmit the message to the destination over an open network, when the destination is included in the destination list. The computer readable medium further includes a message canceling code segment that causes the terminal to cancel a transmission of the message when the destination for the message is not included in the destination list.

According to this aspect of the invention, when messages, such as electronic mail for example, are to be sent over an open network, such as the Internet for example, processing for transmitting the message is not performed in the case where other destinations, that is, other than those registered in the destination list are specified. Thus, the destination for the messages is limited to those other users with whom a user has previously performed communications over a local network, such as ad hoc communications for example.

In this aspect of the invention, the content of the information regarding the destinations stored in the destination list, or the information about the destinations for the messages, is not particularly limited. The information may be specified, for example, based upon the hardware of the terminal used, or the user who operates the terminal. MAC addresses, IP addresses, or device model numbers, for example, may be used for specifying the hardware. Alternatively, electronic mail addresses or user IDs may be used for specifying users. However, as the skilled artisan will readily appreciate and recognize, any other identifying mechanism may be equally used without departing from the spirit or scope of the invention.

According to a second aspect of the present invention, there is provided a computer readable medium containing a communications control program that causes a terminal to communicate over a local network and an open network. A destination list of destinations with which the terminal has previously communicated over the local network is stored in the terminal. The computer readable medium includes a message receiving code segment that causes the terminal to receive a message transmitted over the open network. The computer readable medium further includes a sender specifying code segment that causes the terminal to specify a sender of the message based upon information contained in the message. The computer readable medium further includes a determining code segment that causes the terminal to determine whether the sender is included in the destination list. The computer readable medium further includes a message storing code segment that causes the terminal to store the message in a predetermined storing area when the sender is included in the destination list. The computer readable medium further includes a message deleting code that causes the terminal to delete the message when the sender is not included in the destination list.

According to this aspect of the invention, when messages, such as electronic mail for example, are to be received over an open network, such as the Internet for example, the received message is deleted where it is determined that the sender is other than those registered in the destination list. Thus, the sender of the message is limited to other users with whom a user has performed communications over the local network, such as ad hoc communications for example.

In this aspect of the invention, the content of the information regarding the destinations stored in the destination list or information about the senders of the received messages is not particularly limited. The information may be, for example, specified based upon the hardware of the terminal, or based on the user who operates the terminal. MAC addresses, IP addresses, or device model numbers may be used for specifying the hardware. Alternatively, electronic mail addresses or user IDs may be used for specifying the user. However, as the skilled artisan will readily appreciate and recognize, any other identifying mechanism may be equally used without departing from the spirit or scope of the invention.

According to a third aspect of the invention, there is provided a computer readable medium containing a communications control program that causes the terminal to communicate over a local network and an open network. A destination list of destinations with which the terminal has previously communicated over the local network is stored in the terminal. The computer readable medium includes a request transmitting code segment that causes the terminal to transmit a request for communication with another terminal to a server connectable over the open network. The computer readable medium further includes a list transmitting code segment that causes the terminal to transmit the destination list to the server over the open network. The computer readable medium further includes an acceptance code segment that causes the terminal to receive, from the server, an acceptance of the communications with the other terminal selected by the server, to establish the communications with the other terminal over the open network. The server may select a terminal that corresponds to a destination included in the destination list as the other terminal.

According to this aspect of the invention, when a user plays an online competition game, for example, with another user who is away from the user, e.g. remotely located, the user terminal sends the destination list to a server, for example, that manages online games such as the competition game. The server selects the other user included in the destination list as a competitor against the user. Thus, the other user with whom the user communicates in the online competition game, and the like, may be limited to other users with whom the user has previously performed communications over the local network, such as ad hoc communications for example.

In this aspect of the invention, the content of the information regarding the destinations stored in the destination list is not particularly limited. The information may be, for example, specified based upon the hardware of the computer terminal or the user who operates the terminal. MAC addresses, IP addresses, or device model numbers may be used for specifying the hardware. Alternatively, electronic mail addresses or user IDs may be used for specifying the user. However, as the skilled artisan will readily appreciate and recognize, any other identifying mechanism may be equally used without departing from the spirit or scope of the invention.

According to a forth aspect of the present invention, there is provided a computer readable medium containing a communications control program that causes a terminal to communicate over a local network and an open network. A destination list of destinations with which the terminal has previously communicated over the local network is stored in the terminal. The computer readable medium includes a request transmitting code segment that causes the terminal to transmit, to a server connectable over the open network for example, a request for transmitting a file stored in the server over the open network. The computer readable medium further includes a list transmitting code segment that causes the terminal to transmit the destination list to the server over the open network. The computer readable medium further includes a file receiving codes segment that causes the terminal to receive one of the file and data from the server indicating that the terminal is not allowed to receive the file. The server may transmit the file to the terminal when the file is generated by using data received by the server from the destination included in the destination list. In addition, the server may transmit, to the terminal, the data indicating that the terminal is not allowed to receive the file when the file is generated by using data received by the server from the destination not included in the destination list.

According to this aspect of the invention, when a user wants to view information such as, for example, blogs created by a specific user over the open network, such as the Internet for example, the user terminal transmits the destination list to an information distribution server, for example, that distributes information such as blogs. The server selects and transmits the pages, or the like, of the creator included in the destination list. Accordingly, information viewed on the blog page, or the like, may be limited to information created by other users with whom the user has previously performed communications over the local network, such as ad hoc communications.

In this aspect of the invention, the content of the information regarding the destinations stored in the destination list, or information about the creator of the data to be received, is not particularly limited. The information may be, for example, specified based upon the hardware of the terminal or the user who operates the terminal. MAC addresses, IP addresses, or device model numbers may be used for specifying the hardware. Alternatively, electronic mail addresses or user IDs may be used for specifying the user. However, as the skilled artisan will readily appreciate and recognize, any other identifying mechanism may be equally used without departing from the spirit or scope of the invention.

According to a fifth embodiment of the invention, there is provided a computer readable medium containing a communications control program that causes a terminal to communicate over a local network and an open network. A destination list of destinations with which the terminal has previously communicated over the local network is stored in the terminal. The computer readable medium includes a file request transmitting code segment that causes the terminal to transmit, to a server connectable over the open network for example, a request for transmitting a file stored in the server over the open network. The computer readable medium further includes a file receiving code segment that causes the terminal to receive the file from the server. The computer readable medium further includes a creator specifying code segment that causes the terminal to specify, based upon information stored in the file, a creator of the file, the server having received data necessary for specifying the creator. The computer readable medium further includes a determining code segment that causes the terminal to determine whether the creator is included in the destination list. The computer readable medium further includes a displaying code segment that causes the terminal to display the file when the creator is included in the destination list. The computer readable medium further includes a deleting code segment that causes the terminal to delete the file when the creator is not included in the destination list.

According to this aspect of the invention, when a user wants to view information such as blogs, for example, created by a specific user over an open network, such as the Internet for example, the user may receive a file for which the user requested viewing. Upon receiving the file, the terminal of the user deletes the file of which the creator is not registered in the destination list. Accordingly, information viewed on the blog page, for example, or the like, may be limited to the information created by other users with whom the user has previously performed communications over a local network, such as ad hoc communications for example.

In this aspect of the invention, the content of the information regarding the destinations stored in the destination list of the information about the creator of the received data is not particularly limited. The information may be, for example, specified based upon the hardware of the terminal or the user who operates the terminal. MAC addresses, IP addresses, or device model numbers may be used for specifying the hardware. Alternatively, electronic mail addresses or user IDs may be used for specifying the user. However, as the skilled artisan will readily appreciate and recognize, any other identifying mechanism may be equally used without departing from the spirit or scope of the invention.

In addition, the computer readable medium according to the first aspect of the invention may further include a communication performing code segment that causes the terminal to perform data communication with another terminal over a local network. The computer readable medium may further include a destination recording code segment that causes the terminal to record a destination of the data communications in the destination list.

With such a configuration, when communications are performed over the local network, such as ad hoc communications for example, a destination list that specifies hardware or users corresponding to destinations of the communication may be automatically generated.

According to another aspect of the present invention, the invention may be understood as an invention of a communications control server, in an embodiment where a server receives a destination list from a terminal.

That is, there is provided a communications control server corresponding to the third aspect of the invention, for controlling communications performed over an open network between a first terminal and a second terminal. The terminals are capable of performing a communication over a local network and an open network. The terminals store respectively, a first and a second destination list of destinations with which the first and terminal and the second terminal have previously communicated over the local network. The server includes a first request receiver that receives, over the open network, a request for communication with another terminal from the first terminal. The server further includes a first destination list receiver that receives the first destination list stored in the first terminal from the first terminal over the open network. The server further includes a second request receiver that receives, over the open network, a request for communications with another terminal from the second terminal. The server further includes a second destination list receiver that receives the second destination list stored in the second terminal from the second terminal over the open network. The server further includes a determiner that refers to the first and the second destination lists to determine whether the second and the first terminals are respectively stored in the first and the second destination lists as destinations. The server further includes an establisher that establishes communication between the first terminal and the second terminal over the open network when the determiner determines that the second terminal and the first terminal are respectively stored in the first and second destination lists as destinations.

There is provided a communications control server corresponding to the forth aspect of the present invention, for controlling communications with a terminal over an open network. The terminal is capable of performing communications over a local network and the open network. The terminal stores a destination list of destinations with which the terminal has previously communicated over the local network. The server includes a request receiver that receives, from the terminal, a request for transmitting a file stored in the server over the open network. The server further includes a destination list receiver that receives the destination list from the terminal over the open network. The server further includes a determiner that determines whether the file is generated using data received by the server from a destination included in the destination list. The server further includes a first transmitter that transmits the file to the terminal when the determiner determines that the file is generated using the data received by the server from a destination included in the destination list. The server further includes a second transmitter that transmits, to terminal, data indicating that the terminal is not allowed to receive the file when the determiner determines that the file is generated using data received by the server from a destination not included in the destination list.

A further aspect of the present invention may be understood as an invention of a communications control method executed by a communications control program corresponding to each of the aspects of the computer readable medium.

That is, there is provided a communications control method corresponding to the first aspect of the present invention, for controlling communications performed over an open network between a terminal and an other terminal. The terminals are capable of performing communications over a local network and the open network. The method includes performing a communication between the terminal and the other terminal over the local network. The method further includes storing a destination with which the terminal has performed the communication in a destination list of destinations with which the terminal has previously communicated over the local network, the list being stored in the terminal. The method further includes receiving at the terminal a request for transmitting a message for which destination is designated over the open network. The method further includes determining at the terminal whether the destination for the message is included in the destination list. The method further includes transmitting from the terminal the message to the destination over the open network when the destination is included in the destination list. The method further includes canceling at the terminal a transmission of the message when the destination of the message is not included in the destination list.

There is provided a communications control method corresponding to the second aspect of the invention, for controlling communications performed over an open network between a terminal and an other terminal. The terminals are capable of performing communications over a local network and the open network. The method includes performing a communication between the terminal and the other terminal over the local network. The method further includes storing a destination with which the terminal has performed the communication in a destination list of destinations with which the terminal has previously communicated over the local network, the list being stored in the terminal. The method further includes receiving a message at the terminal for which destination is designated over the open network. The method further includes specifying a sender of the message based upon information contained in the message The method further includes determining, at the terminal, whether the sender is included in the destination list. The method further includes storing, at the terminal, the message in a predetermined storing area to be read out when the sender is included in the destination list. The method further includes deleting, at the terminal, the message when the sender is not included in the destination list.

There is provided a communications control method corresponding to the fifth aspect of the present invention, for controlling communications performed over an open network between a terminal and an other terminal. The terminals are capable of performing communications over a local network and the open network. The method includes performing a communication between the terminal and the other terminal. The method further includes storing a destination with which the terminal has performed the communication in a destination list of destinations with which the terminal has previously communicated over the local network, the list being stored in the terminal. The method further includes transmitting a request for transmitting a file to a server over the open network. The method further includes receiving, at the terminal, the file from the server. The method further includes specifying, at the terminal, a creator of the file, the server having received data necessary for specifying the creator of the file. The method further includes determining, at the terminal, whether the creator is included in the destination list. The method further includes displaying, at the terminal, the file when the creator is included in the destination list. The method further includes deleting, at the terminal, the file when the creator is not included in the destination list.

There are further provided the communications control programs according to the first to fifth aspects of the invention.

BRIEF DESCRIPTION OF THE DRAWINGS

FIG. 7 is a flowchart showing a processing procedure of a message reception of an exemplary communications control program according to an aspect of the invention;

FIG. 8 is a flowchart showing a processing procedure of starting an exemplary online competition game of an exemplary communications control program according to an aspect of the invention;

DETAILED DESCRIPTION OF THE INVENTION

The best mode for carrying out the invention will be described below in detail with reference to the drawings. The following is an example of an embodiment of applying the present invention to a portable game device to exchange messages. A terminal type or a configuration as to whether a program is stored in a terminal or a server in the following explanation is just an illustrative example of an embodiment the invention, and the invention is not limited to the embodiment disclosed.

Figure 1:
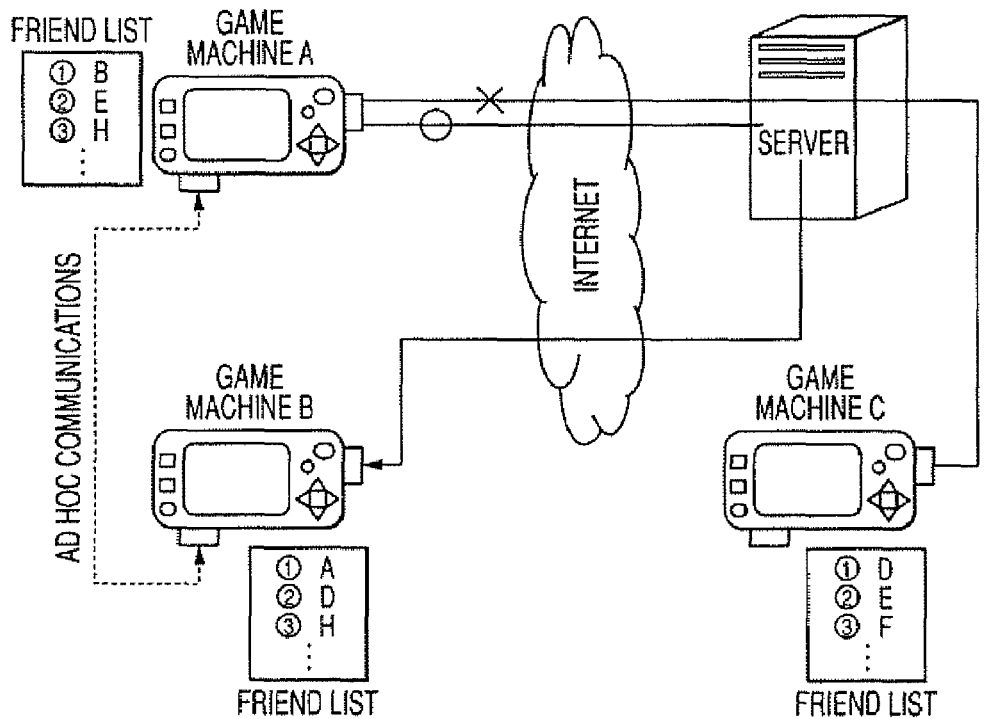
FIG. 1 is a schematic diagram showing an overview of an exemplary message transmission function of an exemplary portable game device having a communications control program according to an embodiment of the invention.
Figure 2:
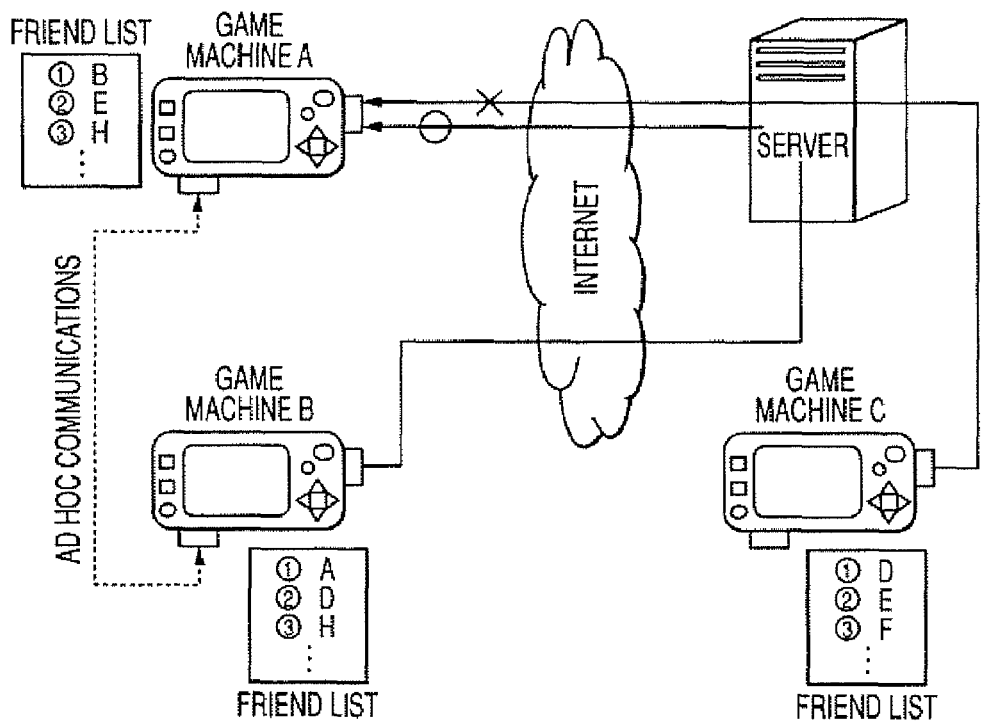
FIG. 2 is a schematic diagram showing an overview of an exemplary message reception function of an exemplary portable game device having a communications control program according to an aspect of the invention.
Figure 3:
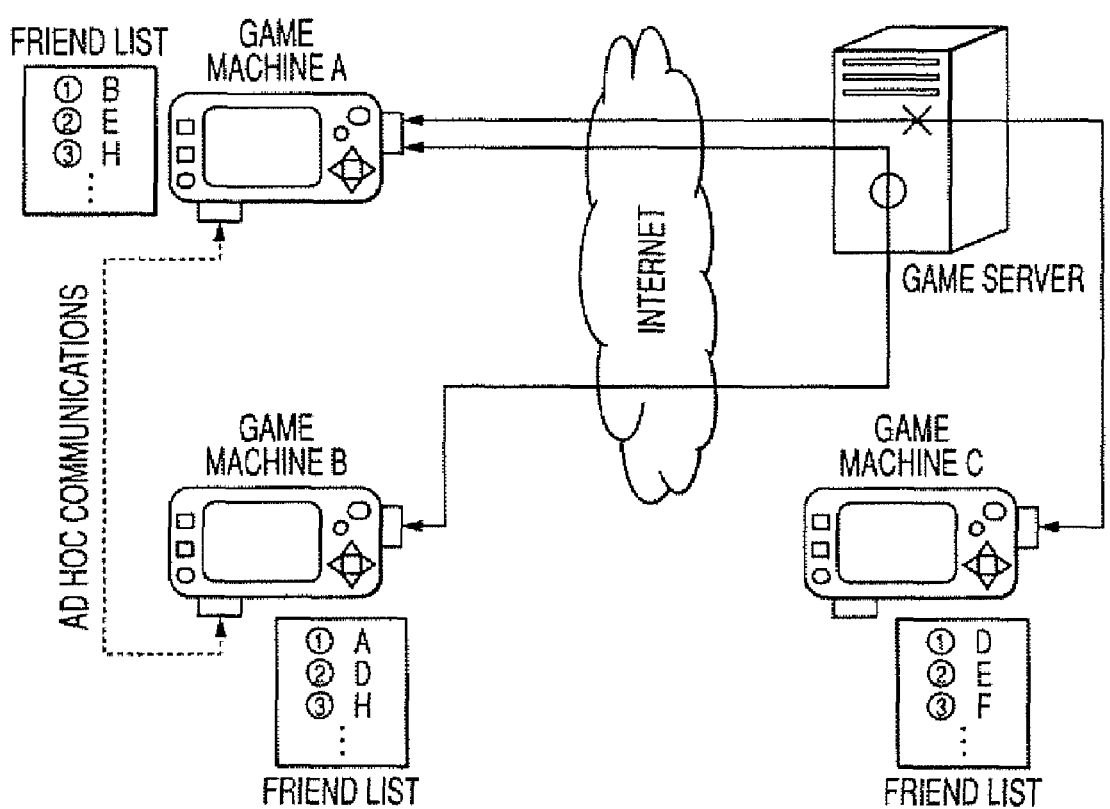
FIG. 3 is a schematic diagram showing an overview of an exemplary competition game function of an exemplary portable game device having a communications control program according to an aspect of the invention.

The outline of an embodiment of the invention will be described with reference to FIGS. 1-3. FIGS. 1-3 respectively show examples of communications over an open network, such as the Internet for example, with other portable game devices by a portable game device having a communications control program according to the embodiment of the invention. FIG. 1 shows an example of sending a message to the other portable game devices. FIG. 2 shows an example of receiving a message from the other portable game devices. FIG. 3 shows an example of playing a match in an online game with the other portable game devices.

In each of FIGS. 1-3, the portable game devices A-C are respectively used by different users. Portable game devices A-C each have a function of communicating with another game device over the local network. In addition, the game devices each have a function of connecting to an open network, such as, for example, the Internet, and thereby exchanging messages.

When the portable game devices A and B communicate with each other over the local network, the portable game device B is registered with the portable game device A as a destination of the local network communication; and, the portable game device A is registered with the portable game device B as the destination. A list of the registered destinations is hereinafter referred to as a "friend list". The destinations registered in the friend list are other users with whom a user communicates over the local network. That is, only other users with whom a user plays the video game face to face are registered in the friend list. In case that children use the game device, their friends with whom they really have played are registered in the friend list.

On the other hand, the user of the portable game device A and the user of the portable game device C have not communicated with each other face to face over the local network, and therefore their friend lists do not include each other's information. However, if no restriction function is provided, the users of the game devices A and C can exchange messages over the Internet or play a match in online games, even though they are not acquainted with each other. In case that children use the game device, they may communicate with a stranger in a place where their parents cannot keep an eye on their activities.

The local network described herein may be, for example, ad hoc communications using a wireless communications function of the game device, communications via a cable connecting each game device, or the like. That is, the form of the network used is not particularly limited, as long as the communications are performed face to face. The content of communications is neither particularly limited. The communications may be performed for allowing the users to play an online competition game or to exchange messages, or in a manner that will be readily appreciated by the skilled artisan without departing from the scope or spirit of the invention.

In addition, information about the destinations registered in the friend list may specify either the hardware (devices) used or the users themselves. In order to specify the hardware, general-purpose identification codes added to the game devices such as MAC addresses or IP addresses, for example, may be used, as well as model codes assigned uniquely by manufacturers of the game devices, or the like. In order to specify the users, general-purpose identification codes such as electronic mail addresses may be used, as well as user names assigned uniquely by manufacturers of the game devices, or the like. However, as the skilled artisan will readily appreciate and recognize, any other identifying mechanism may be equally used without departing from the spirit or scope of the invention.

FIG. 1 shows an example of a message transmission by the game device over the Internet. When the game device A sends a message to another game device via the Internet, the game device A determines whether the destination of the message is registered in the friend list of the game device A.

When game device A is going to send the message to game device B, game device A determines that game device B is registered in the friend list of game device A and that the message may be sent to game device B. Then, game device A sends the message to game device B. When game device A is going to send the message to game device C, game device A determines that game device C is not registered in the friend list of game device A and that the message should not be sent to game device C. Then, the message transmission to game device C is cancelled. Alternatively, in the case where the user information is registered instead of the information about the game devices, a determination is made whether a user B of game device B and a user C of game device C are registered in the friend list.

The form of the messages to be transmitted herein is not particularly limited. Dedicated communications tools provided with the game devices may be used as well as general tools used for exchanging messages over the Internet, such as electronic mail or web mail, for example. The skilled artisan will readily appreciate and recognize that any other type information may be transmitted without departing from the spirit or scope of the invention.

FIG. 2 shows an example of receiving messages by game device A over the Internet. For receiving a message from another game terminal over the Internet, game device A determines whether a sender of the message to be received is registered in the friend list.

When game device A is going to receive the message from game device B, game device A determines that game device B is registered in the friend list of game device A and that the message may be received. Then, the message from game device B is stored in game device A in a form that allows display. When game device A is going to receive a message from game device C, game device A determines that game device C is not registered in the friend list of game device A and that the message may not be received. Then, game device A deletes the message sent from game device C. When user information is registered in the friend list instead of the information about the game devices, it is determined whether user B of game device B and user C of game device C are registered in the friend list.

FIG. 3 shows an example of game device A playing an online competition game over the Internet. When game device A is going to play a match in an online game, game device A connects to the Internet and thereby transmits a game start request to a game server that provides the online game. Game device A also transmits its friend list to the game server together with the game start request. Upon receiving the game start request and the friend list from game device A, the game server stands by for a game start request from another game device that is to be an opponent of game device A.

When the game device being on standby receives the game start request from game device B together with its friend list, the game server determines whether game device A is registered in the friend list of game device B and whether game device B is registered in the friend list of game device A. In the case where the user information is registered instead of the information about the game devices, it is determined whether user A of game device A and user B of game device B are registered in the friend lists of the game devices B and A, respectively. When the game server determines that each piece of game device information or user information is registered in the friend lists with each other, the game server establishes the connection between game devices A and B.

Then, the game server transmits a game program for allowing game devices A and B to play the online competition game. Then, each of the game devices A and B runs the game program transmitted from the game server to play the online game.

When the game server receives the game start request from game device C together with its friend list, the game server determines whether game device A is registered in the friend list of game device C and whether game device C is registered in the friend list of game device A. In the case where the user information is registered instead of the information about the game devices, it is determined whether user A of game device A and user C of game device C are registered in the friend list of game devices C and A, respectively. When the game server determines that each piece of game device information or user information is not registered in the friend lists with each other, the game server does not establish the connection between the game devices A and C. Then, the game server stands by for the game start request from other game devices of which friend lists store the game device information or the user information with each other.

Figure 4:
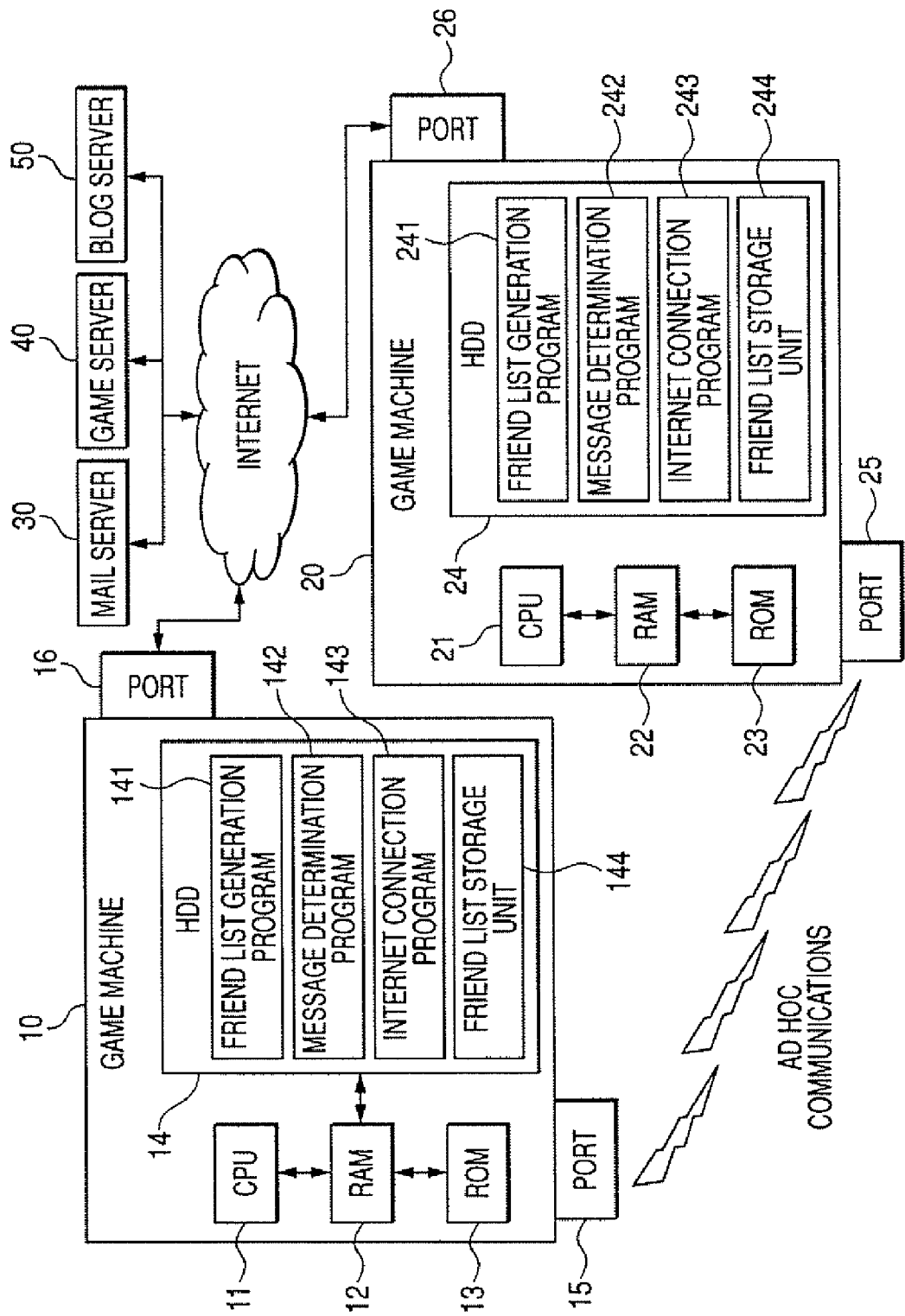
FIG. 4 is a block diagram showing a configuration of an exemplary portable game device having a communication control program according to an aspect of the invention.

FIG. 4 shows a configuration of exemplary portable game devices having an exemplary communications control program according to an embodiment of the invention. A game device 10 includes a central processing unit (CPU) 11, a random access memory (RAM) 12, a read only memory (ROM) 13, a hard drive device (HDD) 14, ports 15 and 16. The HDD stores application programs for each of a friend list generation program 141, a message determination program 142, and an Internet connection program 143. The HDD 14 further includes a friend list storage section 144. The HDD 14 stores various other types of programs, such as, for example, a game program.

In order that the application programs such as the friend list generation program 141, the message determination program 142, the Internet connection program 143 and the like, which are stored in the HDD, executes a predetermined processing, basic programs stored in the ROM 13 for hardware controlling such as input/output controlling are run. The CPU 11 performs an arithmetic processing while the RAM 12 is made to function as a work area.

A game device 20 shown in FIG. 4 includes a configuration that is the same as that of the game device 10. The game devices 10 and 20 can perform ad hoc communications, for example, with each other via the ports 15 and 25, respectively. The game devices 10 and 20 may connect to the Internet via the ports 16 and 26, respectively.

When the game devices 10 and 20 exchange messages or play an online competition game by using the ad hoc communications function, the game devices 10 and 20 start the friend list generation program 141 and a friend list generation program 241, respectively. When the combinations via the ad hoc commutations are established, the game devices 10 and 20 exchange, with each other, their general-purpose addresses such as, for example, MAC addresses or IP addresses, or their unique codes such as device model codes assigned by the manufacturer or the like. Such addresses and codes serve as identification information for allowing the game devices 10 and 20 to identify each other's hardware. Alternatively, the game devices 10 and 20 may exchange general purpose addresses such as electronic mail addresses or unique codes such as user codes for the exclusive use of the game devices. Such addresses or codes serve as identification information for allowing the game devices 10 and 20 to identify each other's user. However, as the skilled artisan will readily appreciate and recognize, any other identifying mechanism may be equally used without departing from the spirit or scope of the invention. For example, biometrics information, such as finger print, retinal imagery, facial imagery, or the like, may be used to identify the users.

Upon receiving the identification information, the friend list generation programs 141 and 241 read the friend list storage section 144 and a friend list storage section 244, respectively. Then, the friend list generation programs 141 and 241 determine whether received identification information is registered in the respective friend lists. When it is determined that the received identification information is registered in each other's friend lists, the processing for the message exchanges or the online competition game, for which the game devices 10 and 20 received the requests, is performed. On the other hand, when the received identification information is not registered in each other's friend lists, processing is performed for registering each other's identification information in the friend list storage sections 144 and 244, respectively.

When the game device 10 is going to send a message to the game device 20 over the Internet, the message determination program 142 is run. The message determination program 142 determines whether a designated destination of the message to be sent is registered in the friend list storage section 144 so as to determine whether the message should be sent. Here, the type of addresses designated as the message destination varies depending on a message transmission tool provided with the game device 10. When a web browser or a mailer for exchanging electronic mail is used, for example, as the message transmission tool, general-purpose addresses such as IP addresses or electronic mail addresses may be designated. When a communications tool for the exclusive use of the portable game device is used as the message transmission tool, dedicated device model codes or user codes may be designated.

When it is determined that the designated destination of the message has been registered in the friend list storage section 144, the game device 10 starts the Internet connection program 144 and thereby connects to the Internet via the port 16. Then, the message is transmitted to a mail server 30 via the Internet. When it is determined that the destination of the message has not been registered in the friend list storage section 144, the Internet connection program 143 is not run, and the transmission of the message is cancelled.

The message transmitted from the mail server 30 reaches port 26 of the game device 20. Then, the game device 20 determines whether to receive the message. When the message reaches the game device 20, the game device starts the message determination program 242. The message determination program 242 specifies the identification information about the sender, which information is received with the message. Then, the message determination program 242 searches for the specified identification information in the friend list storage section 244, and thereby confirms whether the sender of the message has been registered in the friend list of the game device 20. When the sender is registered in the friend list, the received message is stored in the HDD 24 in a form that allows display in accordance with the operation of the user. When the sender is not registered in the friend list, the received message is deleted.

In general, the friend lists registered in the game devices while the devices perform the communications over the local network are identical with each other. Accordingly, as long as the game device sending the message determines whether the destination for the message is registered in the friend list, the game device receiving the message does not need to determine whether the sender is registered in the friend list. However, in the case where denial of the message reception is desired on the receiving side for some reason, the restriction function of message reception may be enhanced by providing the function for checking the friend list upon reception of the message as described above.

When the game device 10 is going to play an online competition game, the Internet connection program 143 is started. The game device 10 connects to the Internet using Internet connection program 143, and thereby accesses the game server 40 to transmit a game start request thereto. In addition, the game device 10 reads the friend list from the friend list storage section 144 and transmits the friend list to the game server 40. The game device 20 also connects to the Internet using the Internet connection program 243 and thereby accesses the game server 40. Then, the game device 20 transmits a game start request to the game server 40 together with the friend list read by the game device 20 from the friend list storage section 244.

When the codes, and the like, specifying the game requested by the game start request received from the game device 10 coincide with the codes specifying the game requested by the game start request received from the game device 20, the game server 40 specifies the users of the game devices 10 and 20 as candidates of competition game opponents. Then, the game server 40 refers to the friend lists received from the game devices 10 and 20. When each of the friend lists includes information that specifies the other game device or user, the game server 40 confirms that the game devices 10 and 20 may communicate with each other. Then, the connection between the game devices 10 and 20 is established. Then, the game server 40 transmits, to the game devices 10 and 20, a game program for allowing the game devices to compete with each other online in the specified game.

When the game device 10 is going to view information on the Internet, or more specifically, is going to view a blog, for example, which a friend of the user of the game device 10 has written, the Internet connection program 143 is activated. The game device 10 accesses the Internet using the Internet connection program 143, and thereby accesses a blog server 50. Then, the game device 10 transmits a blog view request to the blog server 50. The game device 10 reads the friend list from the friend list storage section 144 and transmits the friend list to the blog server 50 together with the blog view request. The blog server stores blog pages, for example, written by various users. Each blog page includes information identifying a creator of the page. For example, the blog page written by the game device 20 includes information identifying the game device 20 or the user of the game device 20.

Upon receiving the blog view request and the friend list from the game device 10, the blog server 50 specifies the creator of the blog page requested by the received view request. Then, the blog server 50 determines whether the creator is included in the friend list received from the game device 10. When the friend list includes information specifying the game device or the user corresponding to the creator of the requested blog page, the blog server 50 determines that the game device 10 and the game device or the user corresponding to the creator of the blog page may communicate with each other. Then, the blog server 50 transmits the requested page to the game device 10. Upon receiving the page from the blog server 50, the game device 10 can view the blog. On the contrary, when the blog server 50 determines that the received friend list does not include the information specifying the game device, or the user corresponding to the creator of the requested blog page, the blog server 50 does not transmit the requested page to the game device 10. Accordingly, the game device 10 cannot view the requested blog page.

The game device 10 may determine whether to permit the viewing of blog page. In this case, the game device 10 transmits only the blog view request to the blog server 50. That is, the game device 10 does not transmit the friend list to the blog server 50. The blog server 50 transmits the requested blog page together with the information identifying the creator of the requested blog page to the game device 10.

Upon receiving the data from the blog server 50, the game device 10 obtains the information identifying the creator of the requested blog page and determines whether the creator is a user registered in the friend list stored in the friend list storage section 144. When the game device 10 determines the creator is registered in the friend list, the game device 10 displays the received blog page on its display. When the game device 10 determines that the creator is not registered in the friend list, the game device 10 deletes the received blog page from the RAM 12 or the HDD 14 without the displaying the page.

Figure 5:
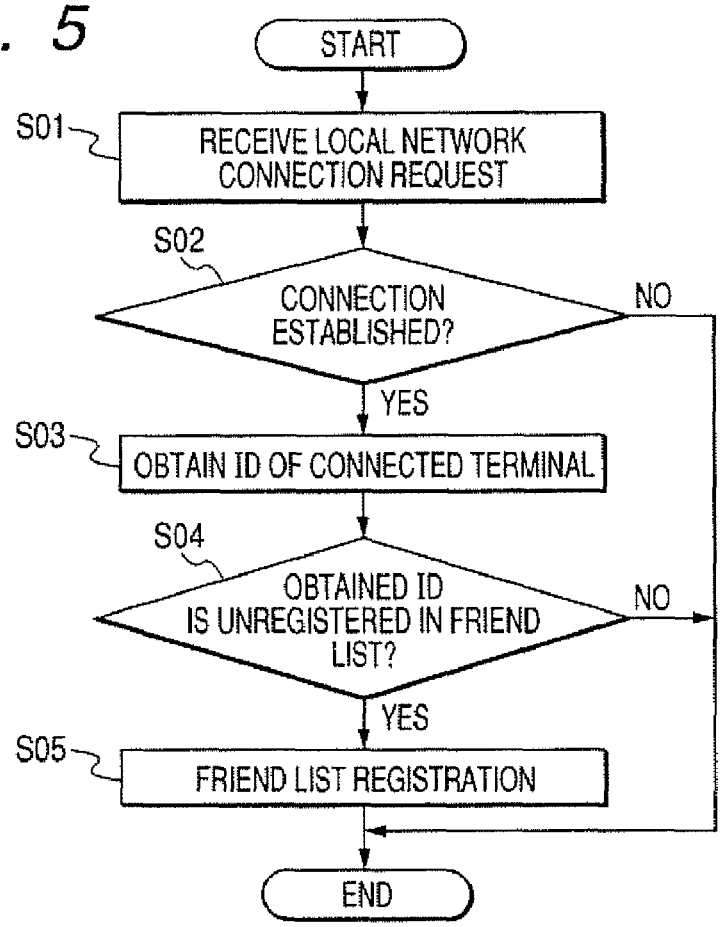
FIG. 5 is a flowchart showing a processing procedure of a friend list registration of an exemplary communications control program according to an aspect of the invention.

Referring to a flowchart of FIG. 5, a processing procedure for an exemplary friend list registration by an exemplary communications control program according to an embodiment of the invention will be explained. First, a game device receives a connection request over a local network from another game device existing in an area that allows communications over the local network (step S01). Upon receiving the connection request, the game device performs connection processing for communicating with the other game device and confirms whether the connection is established (step S02).

When the connection is established, the game device obtains an identification (ID) that identifies the other game device to be connected (step S03). The ID may be received together with the connection request, and may identify either hardware or a user of the other game device. The game device searches a friend list stored in the game device for the obtained ID (step S04). When the obtained ID is not registered in the friend list, the game device registers the obtained ID in the friend list (step S05). When the connection is not established or when the obtained ID has already been registered in the friend list, the processing ends.

Figure 6:
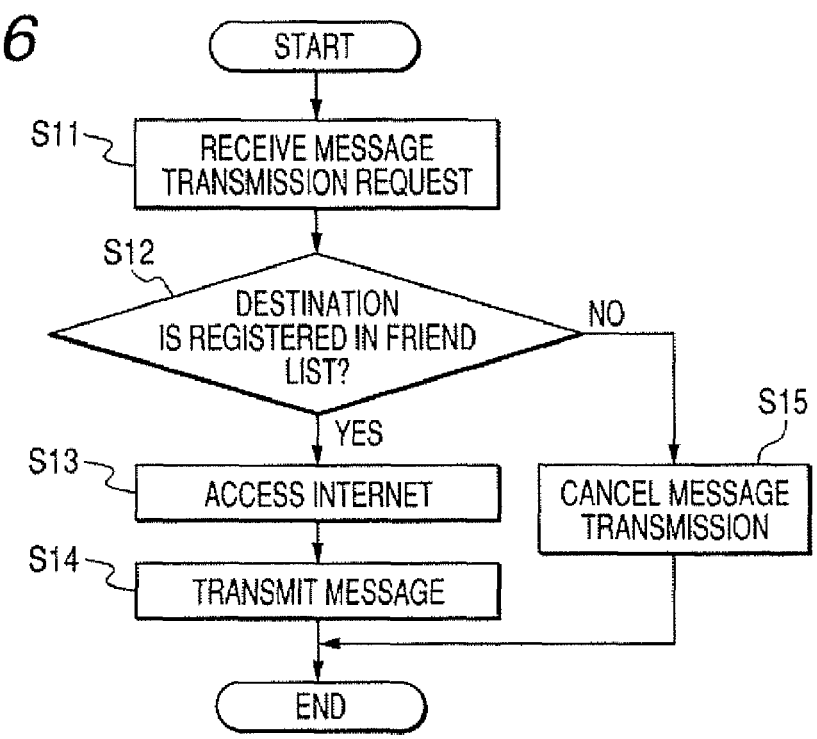
FIG. 6 is a flowchart showing a processing procedure of a message transmission of an exemplary communications control program according to an aspect of the invention.

Referring to a flowchart of FIG. 6, a processing procedure for an exemplary message transmission by an exemplary communications control program according to an embodiment of the invention will be explained. A game device receives a message transmission request, which transmission is performed over the Internet, in accordance with an operation of the game device by a user (step S11). Then, the game device determines whether an identification (ID) that identifies another game device or a user that is specified as a destination of the message to be transmitted is registered in the friend list of the game device (step S12).

When the ID specified as the destination for the message is registered in the friend list, the game device connects to the Internet (step S13), and the message is transmitted to a message server that manages message exchanges (step S14). If the ID is not registered in the friend list, the message transmission processing is canceled (step S15).

Referring to a flowchart of FIG. 7, an exemplary processing procedure for a message reception by an exemplary communications control program according to an embodiment of the invention will explained. A game device connects to the Internet (step S21) and receives a message over the Internet from a mail server that manages message exchanges (step S22) Then, the game device determines whether an identification (ID) that identifies another game device or a user specified as a sender of the received message is registered in a friend list of the game device (step S23).

When the ID specified as the sender of the received message is registered in the friend list, the game device stores the received message on a storage medium in the game device in a form that allows display (step S24). Upon receiving a display request from a user of the game device, the game device displays the stored message. When the ID is not registered in the friend list, the game device deletes the received message (step S25) without displaying.

Figure 9:
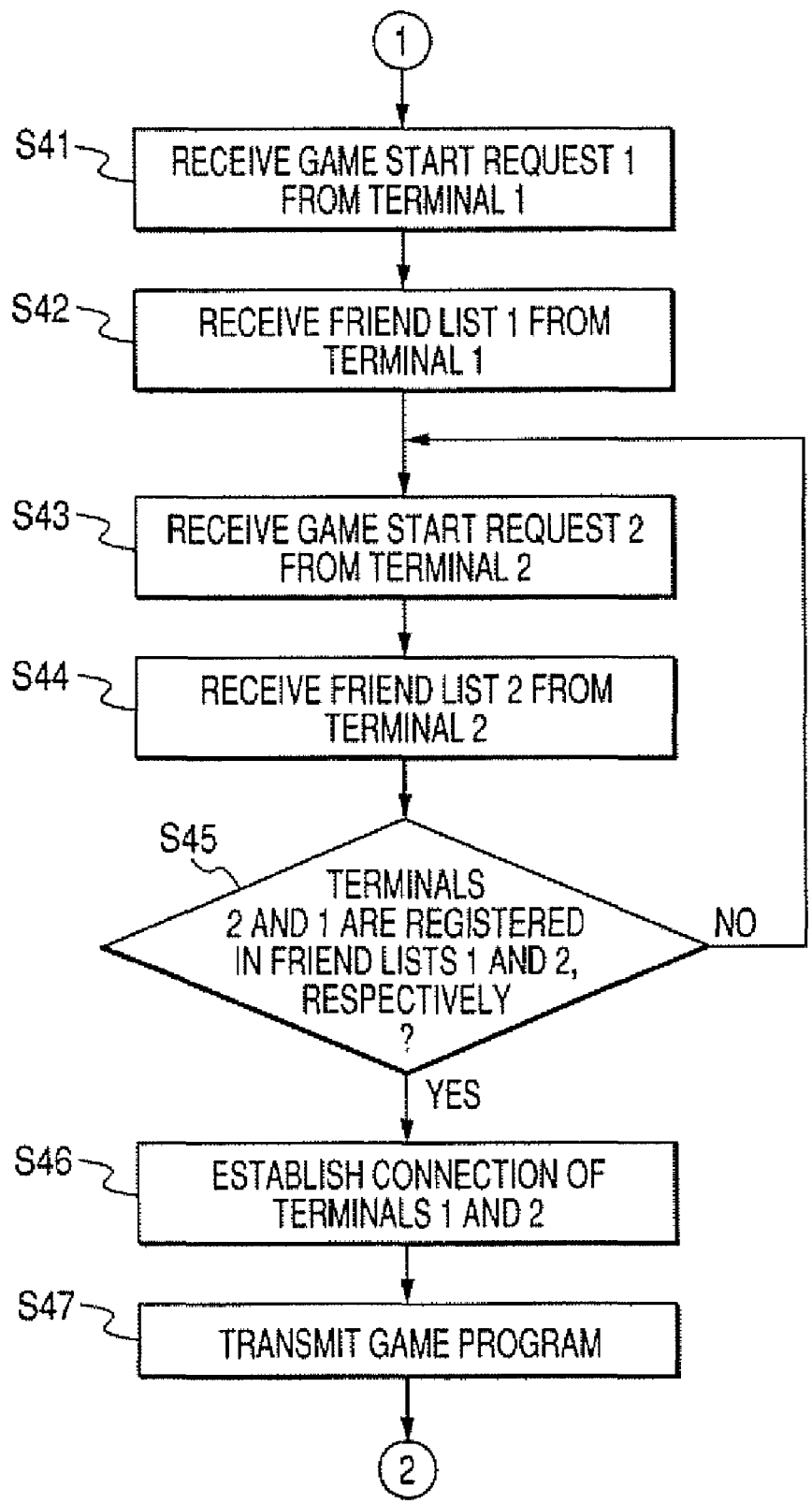
FIG. 9 is a flowchart showing a processing procedure of starting an exemplary online competition game of an exemplary communications control server according to an aspect of the invention.

Referring to the flowcharts of FIGS. 8 and 9, an exemplary processing procedure for starting an online competition game by an exemplary communication control program and an exemplary communications control server according to an embodiment of the invention will be explained. When a user wants to play an online competition game, the user connects a game device to the Internet (step S31) to access a game server. Then, the user selects a game program, which he/she wants to play, from a menu transmitted from the game server (step S32). Then, the user operates the game device to transmit a game start request of the desired game to the game server together with a friend list read from a recording medium in the game device (step S33).

The game server that provides the online game program receives a game start request from a game device 1 (step S41). The game server also receives a friend list from the game device 1 (step S42). Upon receiving the game start request and the friend list from the game device 1, the game server stands by for the game start request from another game device to be a candidate of an online game competitor against the game device 1. The game server receives the game start request of the same game requested by the game device 1 from a game device 2 (step S43) and the friend list of the game device 2 (step S44). Then, the game server determines whether each of the friend lists of the game devices 1 and 2 contains an identification (ID) that identifies each other's game device or user of the game devices (step S45).

When each of the friend lists of the game devices 1 and 2 contain each other's ID, the connections between the game devices 1 and 2 is established (step S46). Then, the game server transmits, to each of the game devices, a game program that allows the game devices to play the desired online competition game (step S47). When either one of the friend lists of the game devices 1 and 2 does not contain the other's ID, the game server stands by for the game start request from another game device to be the candidate of the online game competitor.

When the game server determines the online game competitors and transmits the game program as stated above, each of the game devices receives the transmitted game program (step S34) and executes the online game (step S35).

Figure 10:
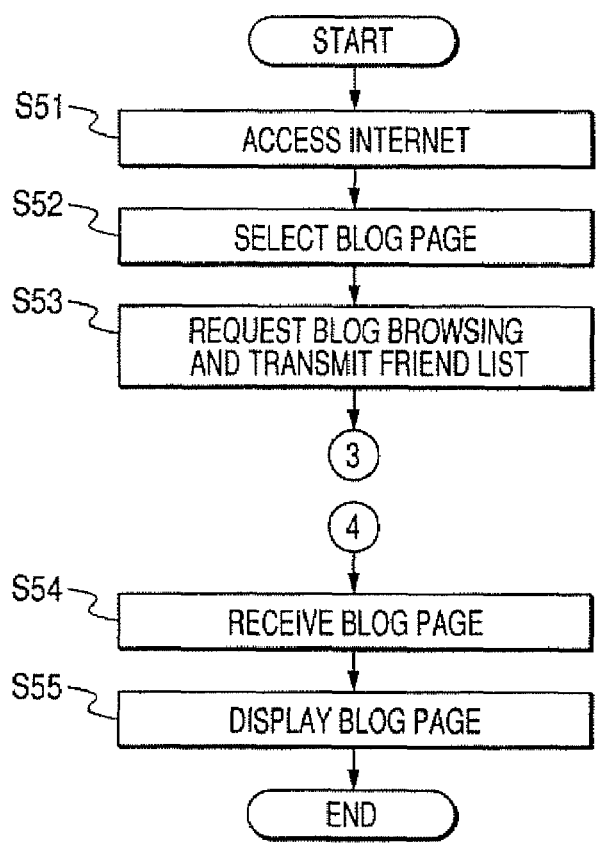
FIG. 10 is a flowchart showing a processing procedure of viewing an exemplary web page of an exemplary communications control program according to an aspect of the invention.
Figure 11:
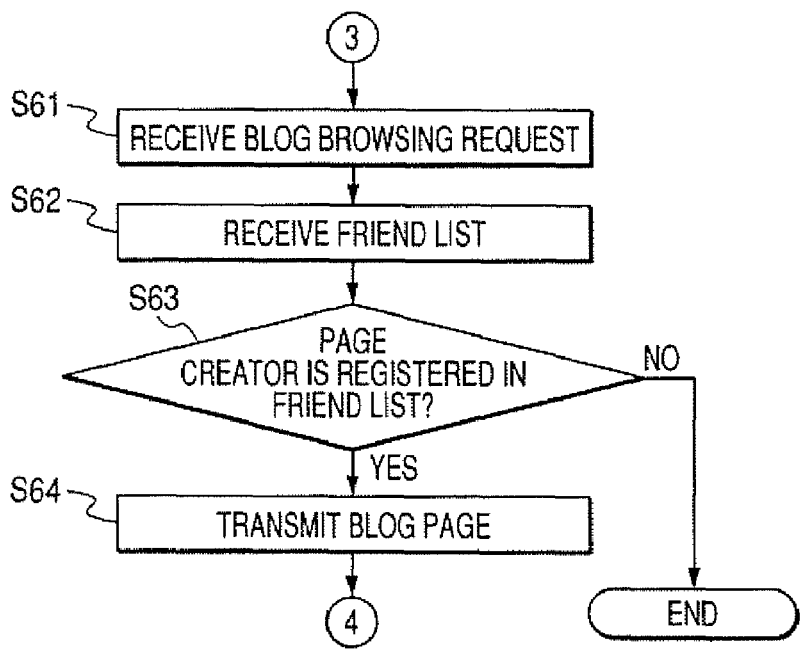
FIG. 11 is a flowchart showing a processing procedure of viewing an exemplary web page of an exemplary communications control server according to an aspect of the invention.

Referring to the flowcharts of FIGS. 10 and 11, an exemplary processing procedure for viewing a web page by using an exemplary communications control program and an exemplary communications control server according to an embodiment of the invention will be explained. In these flowcharts, a blog is viewed as an example of the web page.

When a user wants to view a web page in which a blog is written, the user operates a game device to access the Internet (step S51). The user operates the game device to access a server that manages blogs, and selects a page of the blog, which the user wants to view (step S52). The game device transmits a blog view request to the server together with a friend list read from a recording medium in the game device (step S53).

The server that manages blogs receives the blog view request from the game device (step S61). The server also receives the friend list from the game device (step S62). Then, the server determines whether a creator of the requested blog page is registered in the received friend list (step S63). When the creator is registered in the friend list, the server transmits the requested blog page to the game device (step S64). When the creator is not registered in the friend list, the processing ends without the blog page transmission.

The game device receives the blog page from the server (step S54), and displays the received blog page on its display in a form that allows viewing (step S55). In the embodiment, the content of the web page is not limited to the blog page. Various types of information obtained from the Internet may be applied, such as online discussion boards or chats, in which predetermined users write the information. In addition, the game device that receives the page to be displayed may determine whether the creator of the page is registered in its friend list in place of the server.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure.

This disclosure is intended to cover any and all subsequent adaptations or variations of various embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A computer readable medium that stores an executable communications control program that causes a terminal to communicate over a local network and an open network, the computer readable medium comprising:
   an executable request receiving code segment stored on the computer readable medium that, when executed, causes the terminal to receive a transmission request for transmitting a message over the open network, the message having a destination;
   an executable determining code segment stored on the computer readable medium that, when executed, causes the terminal to determine whether the destination for the message is included in a destination list, the destination list being stored in the terminal and including a list of destinations that the terminal has previously communicated with over the local network;
   an executable message transmitting code segment stored on the computer readable medium that, when executed, causes the terminal to transmit the message to the destination over the open network when the destination is included in the destination list; and
   an executable message canceling code segment stored on the computer readable medium that, when executed, causes the terminal to cancel a transmission of the message when the destination for the message is not included in the destination list.

2. A computer readable medium that stores an executable communications control program that causes the terminal to communicate over a local network and an open network, the computer readable medium comprising:
   an executable message receiving code segment stored on the computer readable medium that, when executed, causes the terminal to a message transmitted over the open network;
   an executable sender specifying code segment stored on the computer readable medium that, when executed, causes the terminal to determine a sender of the message based upon information contained in the message;
   an executable determining code segment stored on the computer readable medium that, when executed, causes the terminal to determine whether the sender is included in a destination list, the destination list being stored in the terminal and including a list of destinations that the terminal has previously communicated with over the local network;
   an executable message storing code segment stored on the computer readable medium that, when executed, causes the terminal to store the message in a predetermined storing area when the sender is included in the destination list; and
   an executable message deleting code segment stored on the computer readable medium that, when executed, causes the terminal to delete the message when the sender is not included in the destination list.

3. A computer readable medium that stores an executable communications control program that causes a first terminal to communicate over a local network and an open network, the computer readable medium comprising:
   an executable request transmitting code segment stored on the computer readable medium that, when executed, causes the first terminal to transmit a request for communication with a second terminal to a server connected to the open network;
   an executable list transmitting code segment stored on the computer readable medium that, when executed, causes the first terminal to transmit a destination list to the server over the open network, the destination list being stored in the first terminal and including a list of destinations that the first terminal has previously communicated with over the local network; and
   an executable acceptance receiving code segment stored on the computer readable medium that, when executed, causes the first terminal to receive an acceptance of the communication request from the server, the request for communication being accepted by the second terminal selected by the server, to establish the communications with the second terminal over the open network, wherein the server selects one of the destinations included in the destination list as the second terminal.

4. A computer readable medium that stores an executable communications control program that causes a terminal to communicate over a local network and an open network, the computer readable medium comprising:
   an executable request transmitting code segment stored on the computer readable medium that, when executed, causes the terminal to transmit, to a server connectable over the open network, a request for transmitting a file stored in the server over the open network;
   an executable list transmitting code segment stored on the computer readable medium that, when executed, causes the terminal to transmit a destination list to the server over the open network, the destination list being stored in the terminal and including a list of destinations that the terminal has previously communicated with over the local network; and
   an executable file receiving code segment stored on the computer readable medium that, when executed, causes the terminal to receive one of the file and data from the server indicating that the terminal is not allowed to receive the file, wherein the server transmits the file to the terminal when the file is generated by using data received by the server from one of the destinations included in the destination list, and wherein the server transmits to the terminal the data indicating that the terminal is not allowed to receive the file when the file is generated by using data received by the server from a destination not included in the destination list.

5. A computer readable medium that stores an executable communications control program that causes a terminal to communicate over a local network and an open network, the computer readable medium comprising:

an executable file request transmitting code segment stored on the computer readable medium that, when executed, causes the terminal to transmit, to a server connectable over the open network, a request for transmitting a file stored in the server over the open network;

an executable file receiving code segment stored on the computer readable medium that, when executed, cause the terminal to receive the file from the server;

an executable creator specifying code segment stored on the computer readable medium that, when executed, causes the terminal to specify a creator of the file based upon information stored in the file, the server having received data necessary for specifying the creator;

an executable determining code segment stored on the computer readable medium that, when executed, causes the terminal to determine whether the creator is included in a destination list, the destination list being stored in the terminal and including a list of destinations that the terminal has previously communicated with over the local network;

an executable displaying code segment stored on the computer readable medium that, when executed, causes the terminal to display the file when the creator is included in the destination list; and an executable deleting code segment stored on the computer readable medium that, when executed, causes the terminal delete the file when the creator is not included in the destination list.

6. The computer readable recording medium according to claim 1, further comprising:

an executable communication performing code segment stored on the computer readable medium that, when executed, causes the terminal to perform a data communication with another terminal over the local network; and an executable destination recording code segment stored on the computer readable medium that, when executed, causes the terminal to record a destination of the data communication in the destination list.

7. A communications control server for controlling communications between a first terminal and a second terminal, the terminals performing a communication over a local network and an open network, the server comprising:

a first request receiver that receives a request for communication with the second terminal from the first terminal over the open network;

a first destination list receiver that receives a first destination list from the first terminal over the open network, the first destination list being stored in the first terminal and including a list of destinations that the first terminal has previously communicated with over the local network;

a second request receiver that receives a request for communication with the first terminal from the second terminal;

a second destination list receiver that receives a second destination list from the second terminal over the open network, the second destination list being stored in the second terminal and including a list of destinations that the second terminal has previously communicated with over the local network; and a determiner that refers to the first and second destination lists to determine whether the second and the first terminal are respectively stored in the first and the second destination lists as destinations; and an establisher that establishes communication between the first terminal and the second terminal over the open network when the determiner determines that the second terminal and the first terminal are respectively stored in the first and second destination lists as destinations.

8. A communications control server for controlling communications with a terminal over an open network, the terminal performing a communication over a local network and the open network, the server comprising:

a request receiver that receives, from the terminal, a request for transmitting a file stored in the server over the open network;

a destination list receiver that receives a destination list from the terminal over the open network, the destination list including a list of destinations that the terminal has previously communicated with over the local network;

a determiner that determines whether the file is generated using data received by the server from one of the destinations included in the destination list;

a first transmitter that transmits the file to the terminal when the determiner determines that the file is generated using the data received by the server from one of the destinations included in the destination list; and a second transmitter that transmits, to the terminal, data indicating that the terminal is not allowed to receive the file, when the determiner determines that the file is generated using data received by the server from a destination not included in the destination list.

9. A communications control method for controlling communications performed over an open network between a first terminal and a second terminal, the first and second terminals performing communications over a local network and the open network, the method comprising:

performing a communication between the first terminal and the second terminal over the local network;

storing, in the first terminal, a destination of the second terminal in a destination list of destinations that the first terminal has previously communicated with over the local network;

receiving, at the first terminal, a request for transmitting a message, the message designating a message destination, the message destination being over the open network;

determining, at the first terminal, whether the message destination of the message is included in the destination list;

transmitting, from the first terminal, the message to the destination over the open network when the massage destination is included in the destination list; and canceling, at the first terminal, a transmission of the message, when the message destination of the message is not included in the destination list.

10. A communications control method for controlling communications performed over an open network between a first terminal and a second terminal, the first and second terminals performing communications over a local network and the open network, the method comprising:

performing a communication between the first terminal and the second terminal over the local network;

storing, in the first terminal, a destination of the second terminal in a destination list of destinations that the first terminal has previously communicated with over the local network;

receiving a message at the first terminal over the open network;

determining, at the first terminal, a sender of the message based upon information contained in the message;

determining, at the first terminal, whether the sender is included in the destination list;

storing, at the first terminal, the message in a predetermined storing area to be read out when the sender is included in the destination list; and deleting, at the first terminal, the message when the sender is not included in the destination list.

11. A communications control method for controlling communications performed over an open network between a first terminal and a second terminal, the first and second terminals performing communications over a local network and the open network, the method comprising:

performing a communication between the first terminal and the second terminal;

storing, in the first terminal, a destination of the second terminal in a destination list of destinations that the first terminal has previously communicated with over the local network;

transmitting a request for a file to a server over the open network;

receiving, at the first terminal, the file from the server;

specifying, at the first terminal, a creator of the file based upon information stored in the file, the server having received data necessary for specifying the creator of the file;

determining, at the first terminal, whether the creator is included in the destination list;

displaying, at the first terminal, the file when the creator is included in the destination list; and deleting, at the first terminal, the file when the creator is not included in the destination list.

12. A communications control program product stored in a terminal that causes the terminal to communicate over a local network and an open network, the program product causing the terminal to execute:

receiving a transmission request for transmitting a message over the open network, the message having a destination;

determining whether the destination for the message is included in a destination list, the destination list being stored in the terminal and including a list of destinations that the terminal has previously communicated with over the local network;

transmitting the message to the destination over the open network when the destination is included in the destination list; and canceling a transmission of the message when the destination of the message is not included in the destination list.

13. A communications control program product stored in a terminal that causes the terminal to communicate over a local network and an open network, the program product causing the terminal to execute:

receiving a message transmitted over the open network;

specifying a sender of the message based upon information contained in the message;

determining whether the sender is included in a destination list, the destination list being stored in the terminal and including a list of destinations that the terminal has previously communicated with over the local network;

storing the message in a predetermined storing area when the sender is included in the destination list; and deleting the message when the sender is not included in the destination list.

14. A communications control program product stored in a first terminal that causes the first terminal to communicate over a local network and an open network, the program product causing the first terminal to execute:

transmitting a request for communication with a second terminal to a server connectable over the open network;

transmitting a destination list to the server over the open network, the destination list being stored in the first terminal and including a list of destinations that the first terminal has previously communicated with over the local network; and receiving an acceptance of the communication request from the server, the request for communication being accepted by the second terminal selected by the server, to establish communication with the second terminal over the open network, wherein the server selects one of the destinations included in the destination list as the second terminal.

15. A communications control program product stored in a terminal that causes the terminal to communicate over a local network and an open network, the program product causing the terminal to execute:

transmitting, to a server connectable over the open network, a request for transmitting a file stored in the server over the open network;

transmitting a destination list to the server over the open network, the destination list being stored in the terminal and including a list of destinations that the terminal has previously communicated with over the local network; and receiving, from the server, one of the file and data indicating that the terminal is not allowed to receive the file, wherein the server transmits the file to the terminal, when the file is generated by using data received by the server from one of the destinations included in the destination list, and wherein the server transmits to the terminal the data indicating that the terminal is not allowed to receive the file, when the file is generated by using data received by the server from a destination not included in the destination list.

16. A communications control program product stored in a terminal that cause the terminal to communicate over a local network and an open network, the program product causing the terminal to execute;

transmitting, to a server connectable over the open network, a request for transmitting a file stored in the server over the open network;

receiving the file from the server;

specifying a creator of the file based upon information stored in the file, the server having received data necessary for specifying the creator;

determining whether the creator is included in a destination list, the destination list being stored in the terminal and including a list of destinations that the terminal has previously communicated with over the local network;

displaying the file when the creator is included in the destination list; and deleting the file when the creator is not included in the destination list.

17. The communications control program product according to claim 12, further causing the terminal to execute:
performing a data communication with another terminal over the local network; and
recording a destination of the data communication in the destination list.

18. The computer readable medium according to claim 1, wherein the communications over the local network are performed face-to-face.

19. The communications control program product according to claim 12, wherein the communications over the local network are performed face-to-face.

* * * * *